No. 639,239. Patented Dec. 19, 1899.
W. P. HUNT & C. P. A. FRIBERG.
CORN PLANTER.
(Application filed Sept. 21, 1899.)
(No Model.) 2 Sheets—Sheet 1.
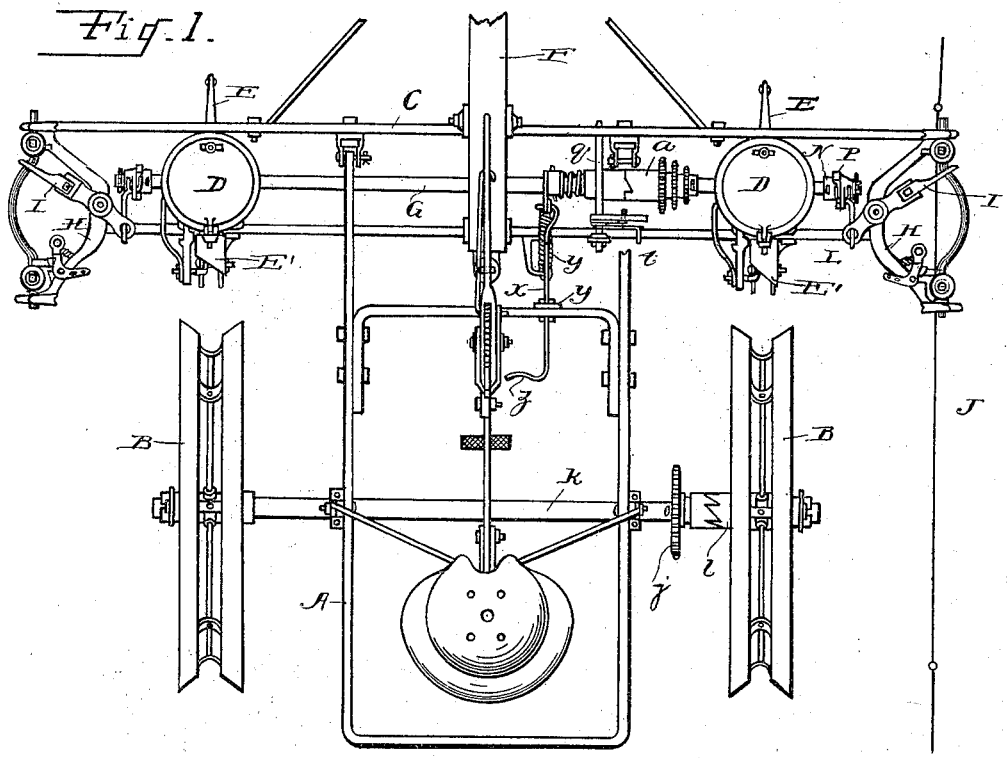
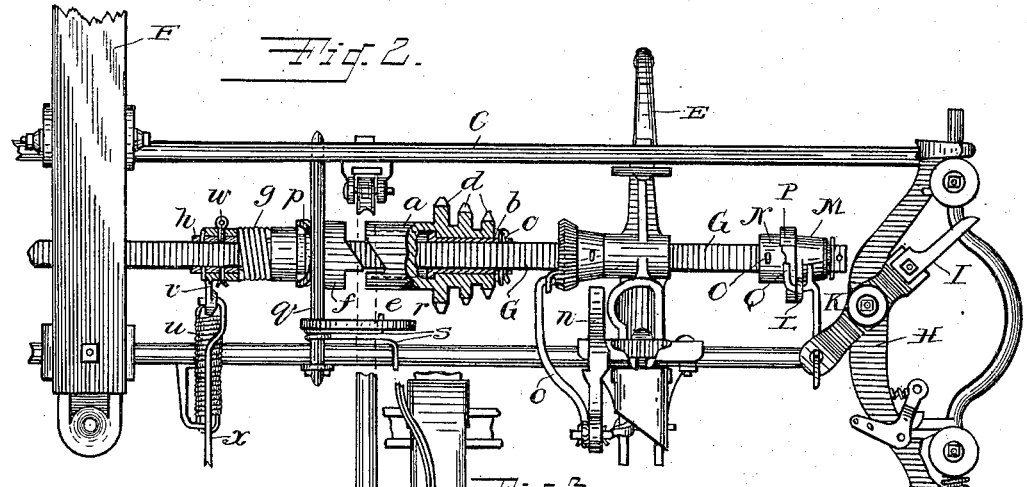
Witnesses:
P. R. Richards.
Ira D. Perry.
Inventors:
Wilson P. Hunt
Chas. P. A. Friberg
By H. M. Richards
Raymond & Quohundro
Atty.

No. 639,239. Patented Dec. 19, 1899.
W. P. HUNT & C. P. A. FRIBERG.
CORN PLANTER.
(Application filed Sept. 21, 1899.)
(No Model.) 2 Sheets—Sheet 2.
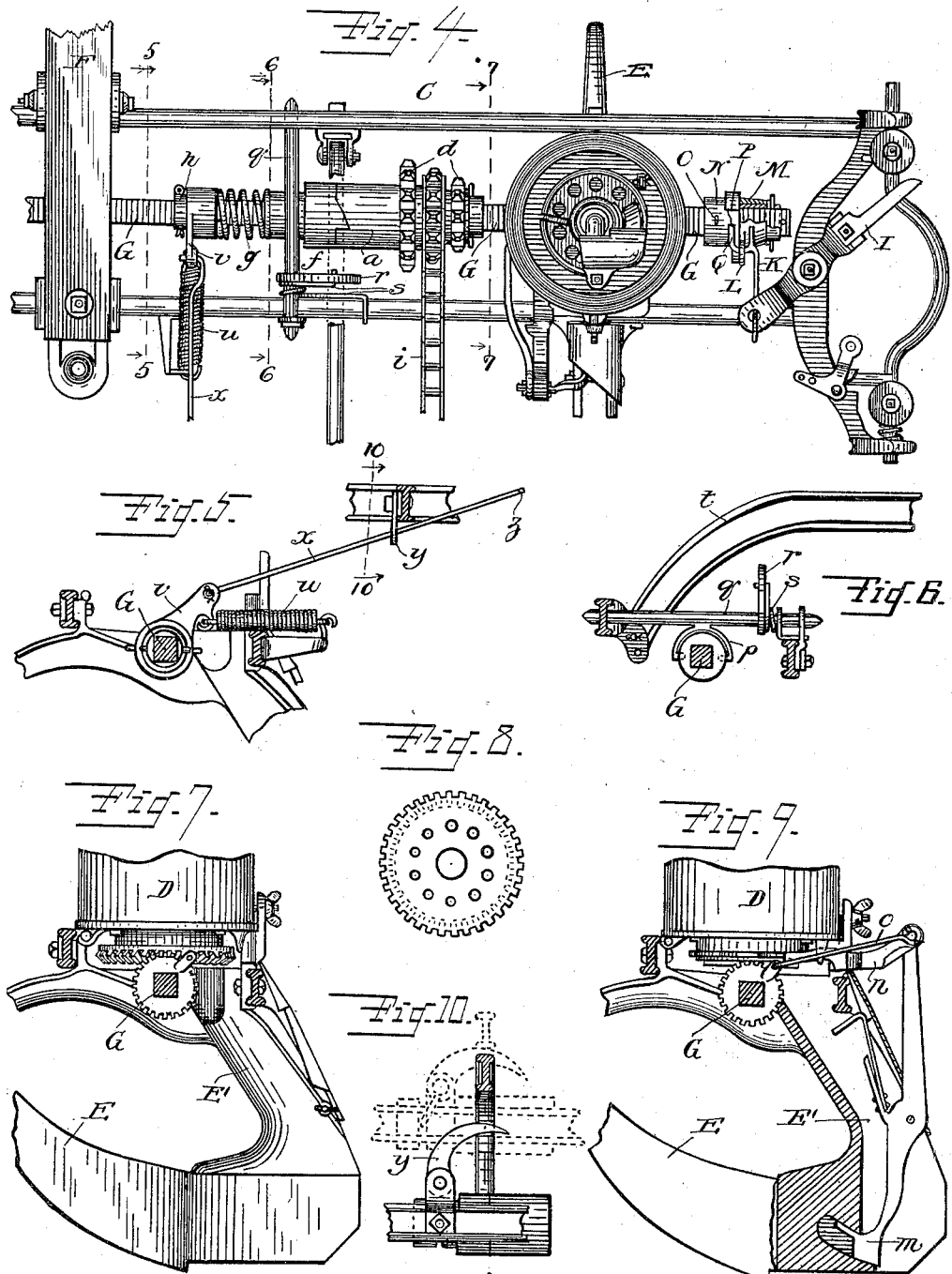

United States Patent Office.

WILSON P. HUNT AND CHARLES P. A. FRIBERG, OF MOLINE, ILLINOIS, ASSIGNORS TO THE DEERE & MANSUR COMPANY, OF SAME PLACE.

CORN-PLANTER.

SPECIFICATION forming part of Letters Patent No. 639,239, dated December 19, 1899.

Application filed September 21, 1899. Serial No. 731,222. (No model.)

*To all whom it may concern:*

Be it known that we, WILSON P. HUNT and CHARLES P. A. FRIBERG, citizens of the United States, residing at Moline, in the county of Rock Island and State of Illinois, have invented certain new and useful Improvements in Corn-Planters, of which the following is a specification.

This invention relates to improvements in that class of corn-planters in which the planter is adapted to be converted from a check-row corn-planter to a drill corn-planter, and vice versa, by alternately throwing into or out of action different sets of devices, but is more especially designed as an improvement upon the type of planters of this class in which a single shaft is used for actuating the dropping mechanism.

Heretofore in all planters of the single-shaft type so far as we are aware the shaft has had one of two modes of operation, in some planters being a rock-shaft alone and rocking slowly for check-rowing and rapidly for drilling, while in other planters the shaft has had a rotary action alone, rotating intermittently for check-rowing and continuously for drilling. Both of these types of planters have proven objectionable, because while a rocking action of the shaft is preferable for check-rowing, a rotary action is preferable for drilling; but none of such prior planters have been capable of these two actions, and hence the rock-shaft type of planter has to depend solely upon rapid rocking to secure the drilling operation, which it imperfectly attains, while the rotary-shaft type of planter must depend upon intermittent rotation for the check-rowing operation, which it imperfectly attains.

The primary object of our invention is to obtain all of the advantages of a rock-shaft for check-rowing and of a continuous rotary movement for drilling and at the same time avoid the necessity for using two separate shafts for accomplishing this desirable result, as is now the common practice.

Another object of our invention is to operate the seed-dropping mechanism from a single shaft adapted and arranged to have imparted thereto either a rocking action for check-rowing or a continuous rotary action for drilling.

A further object is to have such a shaft so operated, adapted, and arranged to be operated as a rock-shaft for check-rowing by the ordinary or any desired style of fork and check-row wire and as a rotary drill-shaft by the usual or any desired chain or gear connection with the ground-wheels or main axle of the planter.

A further object is to have the devices for rocking the seed-dropping mechanism as a check-rower of such character and so disposed that said shaft may be converted into a drill-shaft and continuously rotated without disconnection of the check-rowing devices.

A still further object is to provide an automatic clutch-coupling for throwing the driving mechanism out of gear when the shaft is rotating continuously in drilling, so as to arrest the operation of the seed-dropping mechanism in turning the planter at the ends of rows.

These and such other objects as may hereinafter appear are attained by the devices illustrated in the accompanying drawings, in which—

Figure 1 is a top plan view of a planter embodying our invention, showing the same ready for use as a check-rower. Fig. 2 is a plan view, partly in section, of the right-hand side of the forward frame, showing the seed-box removed. Fig. 3 is a rear elevation of the seed-tube. Fig. 4 is a view similar to Fig. 2, but showing the seedbox in place and the planter rigged for drilling. Fig. 5 is a section on the line 5 5 of Fig. 4 looking in the direction indicated by the arrows. Fig. 6 is a section on the line 6 6 of Fig. 4 looking in the direction indicated by the arrows. Fig. 7 is a section on the line 7 7 of Fig. 4 looking in the direction indicated by the arrows. Fig. 8 is a top plan view of the disk used for drill-planting. Fig. 9 is a view similar to Fig. 7, but showing the seed-tube in central section. Fig. 10 is a detailed section on the line 10 10 of Fig. 5, and Fig. 11 is a detailed plan view of the disk used for check-row planting.

Similar letters of reference indicate the same parts in the several figures of the drawings.

Our invention is applicable to any style of corn-planter, and many features of the different types of corn-planters would be retained and could be adapted for use in connection with our invention without alteration. Solely for the purpose of illustration we have shown our invention in the drawings as applied to a corn-planter of the general type illustrated in Letters Patent to L. E. Waterman, No. 603,584, granted May 3, 1898, as that type of planter exemplifies the single-shaft style of planter; but when our invention is understood it will be obvious to any one skilled in the art to adapt it for use in connection with any other kind of corn-planter, whether it belongs to the check-row-wire type or the wireless type.

Referring now by letter to the accompanying drawings, A indicates the rear or wheel frame of the planter, mounted upon the ground-wheels B and obviously connected to the front bar C of the forward or runner frame of the planter, which latter frame carries the seedbox D, the runners E, and seed-dropping mechanism of any suitable kind, it being deemed unnecessary to herein particularly illustrate or describe any specific set of mechanism, that shown being the same as is illustrated, described, and claimed in the before-mentioned Letters Patent granted to Waterman, and hence forms no part of our present invention.

In the forward frame, to which the tongue F is attached, as usual, is mounted in suitable bearings the shaft G, by means of which the seed-dropping mechanism is actuated, the position of this shaft upon the forward frame and its disposition with relation to the seedbox depending upon the particular kind of seed-dropping mechanism which it is designed to operate.

Upon the ends of the forward frame, which may be of any suitable construction, are mounted the check-row heads H, which may also be of any suitable construction and arrangement, and in the form shown in the drawings embody a horizontal forked lever I, adapted and arranged to engage the check-row wire J for intermittently actuating the shaft G and through it the seed-dropping mechanism in check-row planting. The inner end of the forked lever I in this instance is connected by a rod K with a crank-arm L, projecting from a sleeve M, mounted upon a cylindric extension of a square sleeve N, which latter has a square, polygonal, or other irregular axial opening to fit with non-rotative engagement upon the shaft G, such shaft being shown in the drawings as square and the hole through the sleeve N being correspondingly squared complementary to said shaft, upon which it is secured against endwise movement by a cotter-pin O or by any other suitable fastening device. The sleeve N is provided with a single-tooth ratchet P or some equivalent radial projection, with which engages one branch Q of the bifurcated end of the rod K, which is in effect a pawl, so that whenever the forked lever I is vibrated in the usual manner the pawl Q will engage the ratchet-tooth P and cause a partial rotation or rocking action of the shaft G. We may here state that the means for producing the rocking action of the shaft intermittently through the forked lever and the means for affording a connection producing the effect of a pawl and ratchet between the forked lever and the shaft may differ widely from that herein shown and described and may vary according to the desire or selection of the manufacturer without departing from the spirit of our invention so long as the function of these parts is retained. The importance of this function is that by such a connection between the shaft for operating the seed-dropping mechanism and the means for rocking the same in check-row planting, whether such means be the forked lever, as illustrated in the drawings, or any other kind or arrangement of forked lever or any other kind of operating device, whether a check-row wire be used or not, the shaft may have imparted thereto a continuous rotary action for drill-planting without disconnection or removal of any of the parts employed for operating the shaft in check-row planting, and hence by the employment of a single shaft we are enabled to secure all of the advantages of a rock-shaft in check-row planting and of a continuously-rotating shaft in drill-planting.

To adapt the shaft for continuous rotation in drill-planting, we provide thereon a sleeve $a$, mounted upon an inner sleeve $b$, which latter sleeve is cylindric on its outer periphery, but is square, polygonal, or any other shape on its inner periphery to conform to the shape of the shaft G, with which it rotates and to which it is secured by the cotter-pin $c$ or in any other suitable manner. The sleeve $a$ carries one or more sprocket-wheels $d$ on one end thereof, and its opposite end is formed into a half-clutch $e$, adapted and arranged to engage the opposing half-clutch $f$, mounted directly upon the shaft G, so as to rotate therewith and yet have endwise movement thereon, said half-clutch $f$ being normally impelled to engage the half-clutch $e$ upon the sleeve $a$ by a coil-spring $g$, also sleeved upon the shaft G and confined between the half-clutch $f$ and a collar $h$, secured upon said shaft in proper position as against endwise movement thereon by a cotter-pin or any other suitable device. A sprocket-chain $i$ is trained around one of the sprocket-wheels $d$ on the shaft G and around another sprocket-wheel $j$, mounted so as to have endwise movement upon the main axle $k$ of the planter, the hub of the sprocket-wheel *j* being provided with a half-clutch to engage the half-clutch *l* on the hub of the ground-wheel of the planter, by which means rotary motion is imparted to the sprocket-wheel *j* when desired and through the sprocket-wheel-and-chain connection with the clutch-sleeve *a* to the shaft G, said rotary motion being continuous and may be imparted to said shaft, as before explained, without removal or disconnection of any of the devices for imparting to said shaft a rocking action in check-row planting by reason of the provision of the pawl-and-ratchet connection or some equivalent connection between said shaft and the means for operating the same in check-rowing. It will also be understood that during the check-row planting the sprocket-chain *i*, connecting the sprocket-wheels *d* and *j*, will be removed and that during the drilling operation the lower valve *m* in the seed-tube E', the pawl *n*, which connects it with the seed-plate, and the link *o*, which connects the lower valve with the shaft G, will all be removed in drill-planting for reasons which are perfectly obvious to any one skilled in this art, such changes being common with all tubes of convertible planters, as well as the changing of the seed-dropping plate, which should be a check-row wheel or disk, substantially like that shown in Fig. 11, for check-row planting or a drill wheel or disk, substantially like that shown in Fig. 8, for drill-planting. Obviously the removable parts above mentioned, as well as the seed-dropping plates, whether drill or check-row disks, may be made in any ordinary manner, or any ordinary device may be substituted therefor, and the forked lever may also be of any ordinary or desired kind, and its gear to the rock-shaft and to the seed-dropping mechanism may be of any type which will allow the rock-shaft to be rotated with the forked lever in place.

The purpose of mounting the sleeve *a* upon a cylindric bearing, which permits it to run free when not engaged by the clutch *f*, is to provide means for automatically arresting the drill-planting operation in turning the planter at the ends of rows, and this operation we effect by means of a yoke *p*, (seen more clearly in Fig. 6,) engaging an annular groove in the half-clutch *f* and depending from a rock-shaft *q*, suitably journaled in the bars of the forward frame, said shaft having an upwardly-projecting crank-arm *r* thereon, acted upon by a spring *s*, which tends to rock the shaft in the direction that will cause the same to normally press the half-clutch *f* into engagement with the half-clutch *e* on the sleeve *a* in a manner that is obvious. The arm *r* rises above the plane of the bars of the forward frame and underlies the bar *t* of the main frame of the planter just to the rear of the pivotal connection of said bar with the forward frame of the planter, so that when the forward frame is raised at the end of a row or elsewhere to lift the runners clear of the ground the arm *r* will strike the underside of the bar *t* and rock the shaft *q*, so as to cause the fork *p* to overcome the tension of the spring *g* and slide the half-clutch *f* endwise upon the shaft G out of engagement with the sleeve. With the parts in this position the sleeve will rotate freely without causing any operation of the shaft G and the planter may be driven from field to field or may turn at the ends of rows without planting. Both springs *g* and *s* are not necessary. Either is sufficient.

During the check-row-planting operation it is of course necessary to have the shaft G rocked back to its first position after each operation by the rocking means, such as the forked lever, as usual in this class of planters, and any spring device of any suitable character may be employed for accomplishing this object.

In the drawings is shown the usual coil-spring *u*, secured at one end of a stationary portion of the forward frame of the planter and at its opposite end to a hook on the crank-arm *v*, which arm is ordinarily mounted directly upon the shaft G. In order, however, that the shaft may be free to rotate in the drilling operation, we mount the hub of said arm upon the cylindric outer surface of the sleeve *h* and provide for keying the arm to the shaft whenever it is desired by means of the cotter-pin *w*, which passes through the hub of said arm, the sleeve *h*, and the shaft G, as more clearly shown in Figs. 2 and 4. When the cotter-pin is withdrawn, the shaft and sleeve *h* are no longer affected by or under the control of the spring *u*, and hence may be rotated freely. We also provide the usual foot-rod *x* for check-rowing short rows or at the ends of rows by foot-power, such rod being connected at one end with the end of the arm *v* and passing over the hook *y* on the under side of the front bar of the main frame, as shown more clearly in Figs. 1, 5, and 10, the hook and bearing being shown in an inverted position in Fig. 10. The end of the foot-rod projects rearwardly toward the driver's seat and either carries or terminates in a suitable foot-piece *z* in convenient reach from the operator's seat.

Although we have illustrated and specifically described the construction and relative arrangement of the several elements of our improvement, we desire it understood that the construction and arrangement shown is only one embodiment of our invention and that obviously numerous changes may be made in the construction and arrangement of parts without departing from the spirit of our invention. We therefore do not desire to be confined to the specific construction and arrangement shown and described, as such changes or modifications may be made as fairly fall within the scope of our invention.

Having thus fully described our invention, what we claim, and desire to secure by Letters Patent, is—

1. In a planter, the combination with the seed-dropping mechanism, of a shaft adapted to operate said mechanism and means for imparting to said shaft either a rocking or a continuous rotary movement, substantially as and for the purpose described.

2. In a planter, the combination with the seed-dropping mechanism, of a shaft for operating the same, a gear connection between said shaft and a ground-wheel of the planter for continuously rotating said shaft and independent means for imparting to said shaft a rocking action when said connection is broken, substantially as and for the purpose described.

3. In a planter, the combination with the seed-dropping mechanism, of a shaft for operating said mechanism, means connecting said shaft and a ground-wheel of the planter for continuously rotating said shaft and means connected by a pawl and ratchet, or its equivalent, with the said shaft for rocking said shaft when the first-mentioned connection is broken, substantially as and for the purpose described.

4. In a planter, the combination with the seed-dropping mechanism, of a shaft for operating the same and means adapted for continuously rotating said shaft, a check-row head, the forked lever thereof and a pawl-and-ratchet connection between said lever and said shaft whereby said shaft may be intermittently rocked, substantially as and for the purpose described.

5. In a planter, the combination with the seed-dropping mechanism, a shaft for operating the same and means adapted to continuously rotate said shaft, of a check-row head, the forked lever thereof, a crank-arm loosely mounted on said shaft, a projection or rod fixedly mounted on said shaft adjacent to said crank-arm and a rod connecting said arm and the forked lever and adapted to engage said projection on the shaft whereby said shaft may be intermittently rocked, substantially as and for the purpose described.

WILSON P. HUNT.
CHARLES P. A. FRIBERG.

Witnesses:
J. A. HAMMER,
H. M. OLDEFEST.